United States Patent [19]

Enters

[11] 4,016,770
[45] Apr. 12, 1977

[54] PULLEY ASSEMBLY
[75] Inventor: Edward W. Enters, Fredonia, Wis.
[73] Assignee: Gilson Bros. Co., Plymouth, Wis.
[22] Filed: Nov. 3, 1975
[21] Appl. No.: 628,188
[52] U.S. Cl. .............................. 74/230.3; 74/230.8; 403/313; 403/373
[51] Int. Cl.[2] ................. F16H 55/54; F16H 55/36; F16B 2/02; B25G 3/20
[58] Field of Search .......... 74/230.3, 230.8, 220.8; 403/240–242, 309–313, 344, 373; 29/159 R

[56] References Cited
UNITED STATES PATENTS

| | | | |
|---|---|---|---|
| 2,724,975 | 11/1955 | Drummond | 74/230.8 |
| 3,722,310 | 3/1973 | Schultz, Jr. | 74/230.3 X |

FOREIGN PATENTS OR APPLICATIONS

| | | | |
|---|---|---|---|
| 40,586 | 11/1936 | Netherlands | 74/230.3 |

Primary Examiner—Leonard H. Gerin
Attorney, Agent, or Firm—Joseph P. House, Jr.

[57] ABSTRACT

An assembly of a pulley and shaft and a coupling therebetween. The coupling comprises a clamp having radially deformable jaws embracing the shaft and a jaw actuator for moving the jaws toward the shaft to clamp the pulley to the shaft. The clamp can be incorporated in a pulley having complementary mating stamped half sections. In one embodiment, the stamped pulley half sections have oppositely embossed hub portions forming a pocket in which the clamp is received internally. In another embodiment, the clamp is exposed and is mounted on the outside of one of the pulley half sections.

9 Claims, 5 Drawing Figures

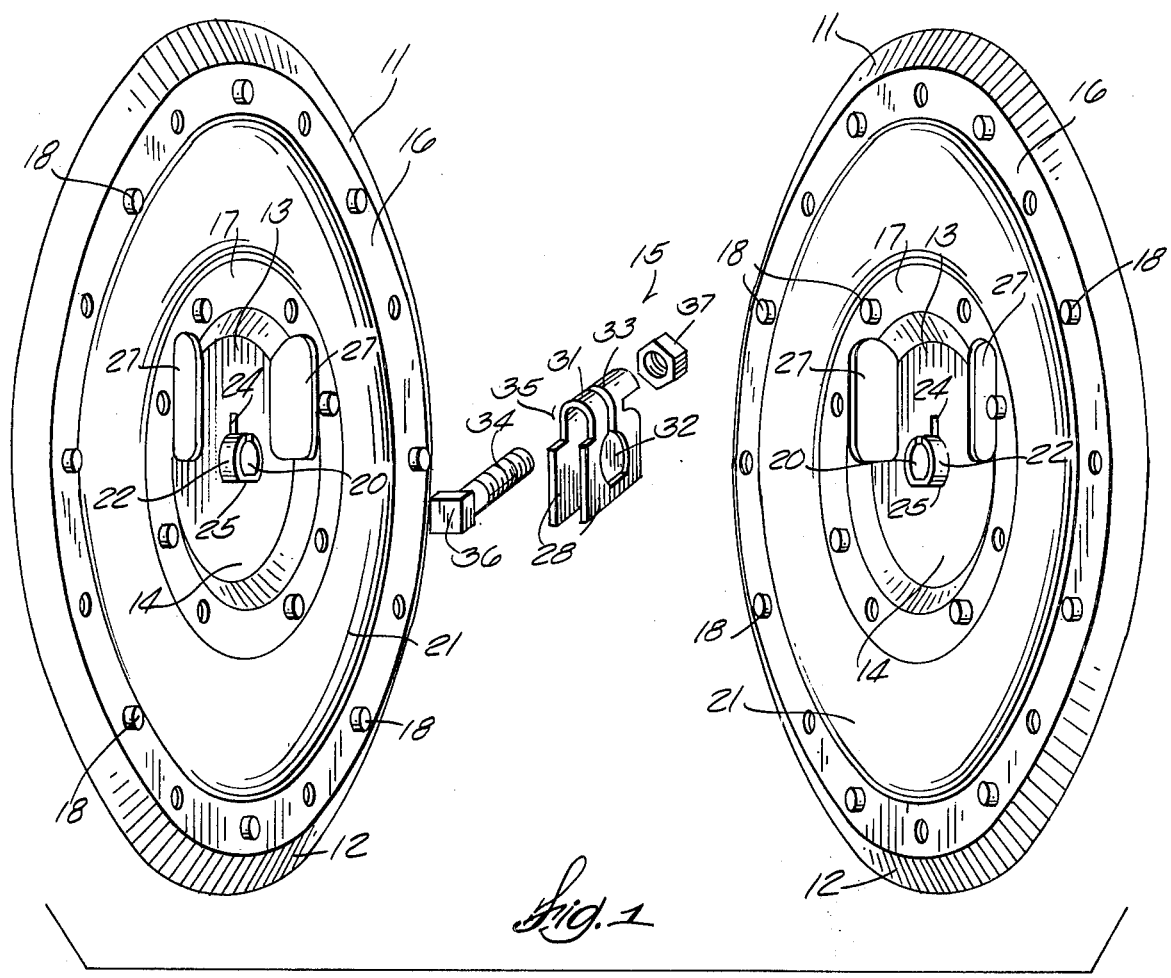
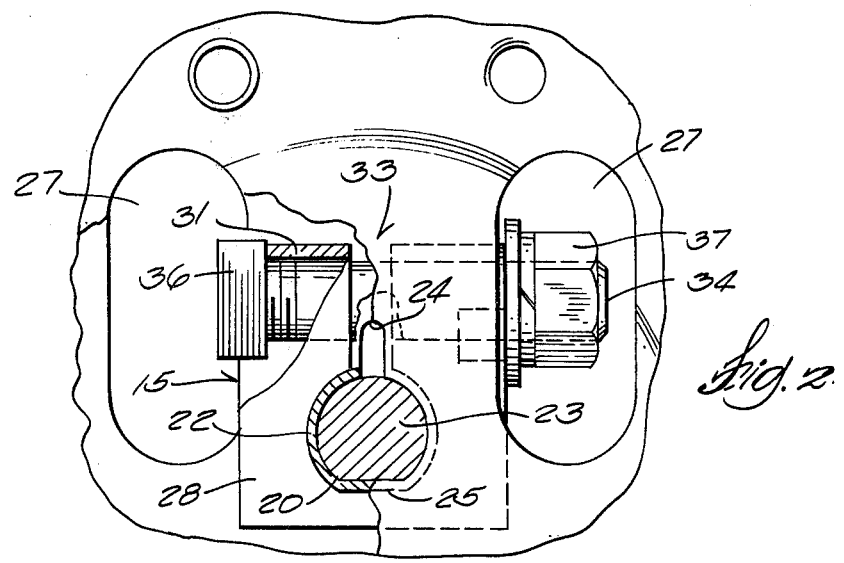

PULLEY ASSEMBLY

BACKGROUND OF THE INVENTION

It is known to fabricate pulleys out of stamped complementary half sections which are fastened together, as by welding. The hub portions of such pulleys typically have keys which interlock with a shaft to transmit torque between the shaft and pulley. However, it is a problem to securely anchor the shaft to the pulley without play therebetween. Various fasteners have been suggested for this purpose, for example, the set screws illustrated in U.S. Pat. Nos. 3,094,009 and 3,324,735. Such set screws have only a small area of frictional contact and do not effectuate an adequately tight and play-free coupling.

SUMMARY OF THE INVENTION

In accordance with the present invention, a clamp having large areas of frictional contact between the shaft and pulley is provided and is particularly adapted for pulleys formed of stamped mating sections, although the clamp could also be applied to the pulleys fabricated by other techniques. The clamp of the present invention has radially deformable jaws which embrace the shaft. A jaw actuator is provided for moving the jaws toward the shaft to clamp the pulley to the shaft.

Various embodiments of the invention are contemplated. In one embodiment in which relatively large pulleys are involved, the stamped pulley halves are provided with hub portions wich are oppositely embossed outwardly to create a pocket within which the clamp is received. In smaller pulleys, the clamp can simply be mounted on the outside of the hub of one pulley half section.

In preferred embodiments, the pulley or clamp is provided with a key which positively interlocks with the shaft. This provides the basic torque drive between the pulley and shaft. However, when the clamp of the present invention is engaged, it will rigidly secure the pulley and shaft together to eliminate play therebetween and insure against shifting of the pulley with respect to the shaft due to vibrational and other working stresses which are imposed thereon.

Other objects, features and advantages of the invention will appear from the disclosure hereof.

DESCRIPTION OF THE DRAWINGS

FIG. 1 is an exploded perspective view of separately fabricated stamped pulley half sections in spaced apart relationship prior to their assembly. This view also illustrates a clamp embodying the invention which is received in a pocket formed in the hub portions of the pulley half sections.

FIG. 2 is a fragmentary radial cross section taken along the line 2—2 of FIG. 3.

DESCRIPTION OF THE PREFERRED EMBODIMENTS

Although the disclosure hereof is detailed and exact to enable those skilled in the art to practice the invention, the physical embodiments herein disclosed merely exemplify the invention which may be embodied in other specific structure. The scope of the invention is defined as in the claims appended hereto.

Figure 3:
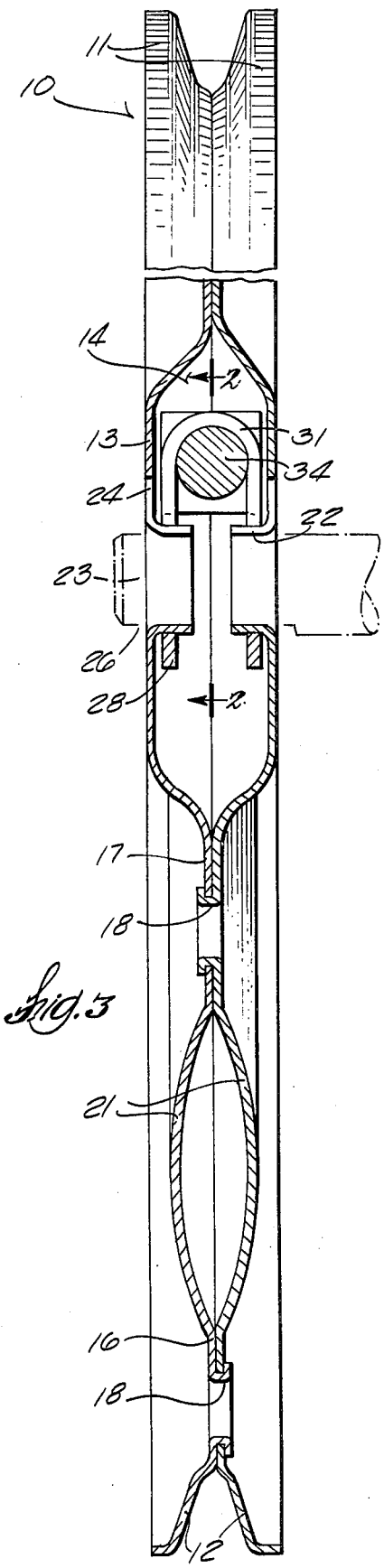
FIG. 3 is a fragmentary axial cross section taken through the pulley assembly of FIGS. 1 and 2.

The embodiment of FIGS. 1–3, inclusive, illustrates a relatively large size pulley 10 fabricated out of two identical stamped half sections 11 which are assembled back-to-back as illustrated in FIG. 3. Each half section 11 is formed with a peripheral flange 12 which in the assembled pulley shown in FIG. 3, come together to form a pulley groove or sheave to receive a V-belt. The hub portions 13 of each pulley half section 11 is embossed oppositely and outwardly to provide a center cavity or pocket 14 to receive the clamp or coupling 15. Each half section 11 is also shaped to form annular bands 16, 17 which mate when the half sections are assembled, as shown in FIG. 3. Bands 16, 17 are provided with series of spaced rivets 18 to hold the half sections in assembled relationship. Intermediate the bands 16, 17 the half sections are embossed oppositely and outwardly at 21 to give an appropriate re-enforcing contour to the pulley.

In the course of fabricating the half section 11, the center of each hub 13 is formed to provide a shaft-receiving opening 20 bounded by an axially extending flange 22 which receives and embraces shaft 23. Hole 20 is extended laterally by a radially extending slot 24. Flange 22 is discontinuous across slot 24. Center opening 20 and slot 24 together form a keyhole-shaped opening. The flange 22 is thus rendered resiliently deformable under clamping pressure as hereinafter described.

In accordance with the present invention, hole 20 and flange 22 are not perfectly circular. The side of hole 20 and flange 22 opposite slot 24 is flattened at 25, complementary to a corresponding flat portion 26 on the shaft 23, thus to key the pulley to the shaft 23 when the parts are assembled, as shown in FIG. 3.

In the course of fabricating pulley half sections 11, clamp access openings 27 are also formed, partly in the hub 13 and partly in band 17.

Before the two half sections 11 are mated, coupling clamp 15 is disposed in the pocket 14, as shown in FIGS. 2 and 3. Clamp 15 comprises a metal strip bent into a U-shape. The clamp comprises corresponding parallel wing portions 28 and an intermediate bight portion 31. Each wing 28 has a keyhole-shaped opening including shaft-receiving opening 32 which embraces the shaft 23 and flange 22 of a pulley half section 11 and a radially extending slot 33 which bifurcates the bight 31. The portions of the wings 28 about the shaft-receiving opening 32 comprise deformable jaws of the clamp 15. The bight portions 31 at opposite sides of the slot 33 comprise levers free-ended by which the pressure of a jaw actuator bolt 34 is imposed on the levers to deform the jaws toward tighter embracing relationship to the flanges 22 and shaft 23.

One end of bight 31 is provided with a relief or cut-out ledge 35 to seat the head 36 of bolt 34. The other end of bolt 34 threadably receives a nut 37. As best shown in FIG. 2, the access holes 27 in the pulley half sections 11 provide manipulating access to the bolt head 36 and nut 37. When the parts are assembled, as shown in FIGS. 2 and 3, clamping pressure of the coupling clamp 15 is applied by tightening the bolt 34. The bolt thus applies pressure on the bight levers 31 so that the levers can move toward each other into the slot 33 therebetween and exert corresponding pressure on the flanges 22 of the pulley half sections as permitted by the slot 24. One jaw wing 28 of clamp 15 acts on the flange 22 of one pulley half section 11 and the other jaw wing 28 of clamp 15 acts on the flange 22 of the other pulley half section 11. Accordingly, the flanges 22 of both pulley half sections 11 are forced into tight gripping relationship to the shaft 23 to firmly lock the pulley and shaft together. In this manner substantial areas of the shaft and flanges 22 are brought into tight frictional and pressure engagement.

When it is desired to loosen the coupling 15, bolt 36 is manipulated to relieve the pressure on the clamp jaws, thus relaxing the grip of the jaws on the flanges 22 and shaft 23, whereupon the pulley may be shifted with respect to shaft 23 or removed endwise from the shaft 23.

Figure 4:
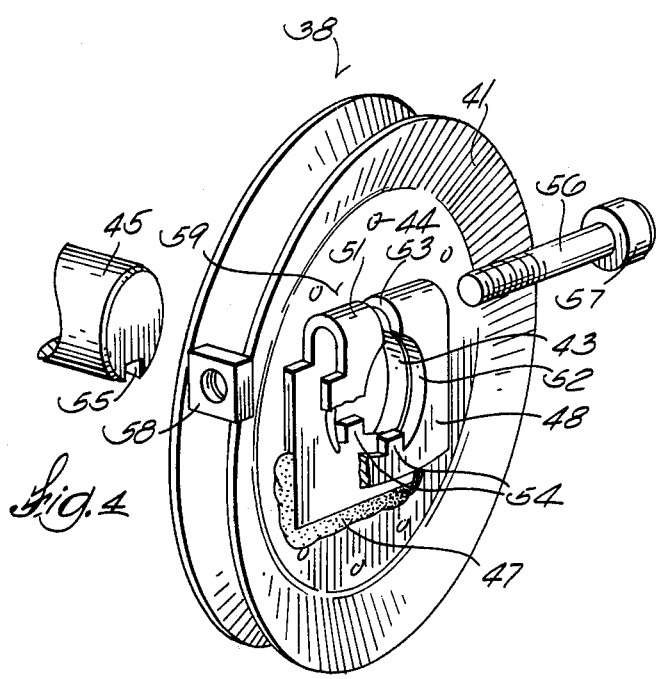
FIG. 4 is a perspective view of a modified embodiment of the invention in which the clamp is mounted on the outside of the pulley halves.
Figure 5:
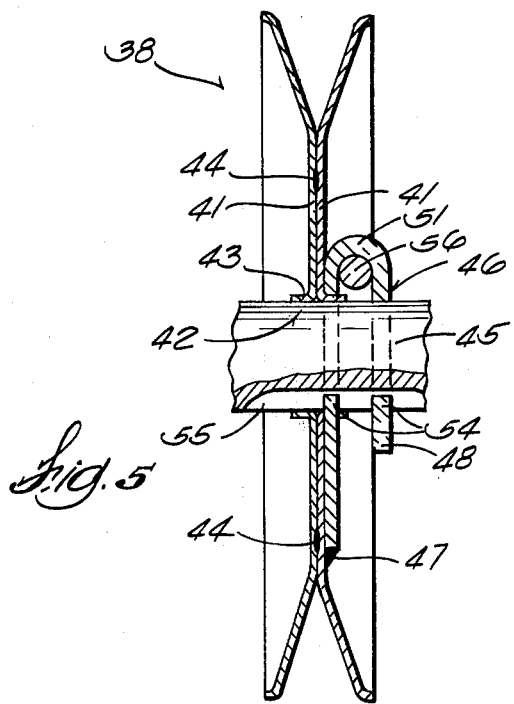
FIG. 5 is a fragmentary axial cross section taken through the assembly of FIG. 4.

The modified embodiment illustrated in FIGS. 4 and 5 embodies the same principal and fundamental structure as the embodiment of FIGS. 1, 2 and 3, except that the clamp coupling is mounted externally of the pulley. In this embodiment, the pulley 38 has complementary half-sections 41 which are typically much smaller in diameter than the half sections 11 of pulley 10. Central pulley opening 42 is defined by flanges 43. The pulley half sections 41 are held together by spot welds 44.

A coupling clamp 46 by which the pulley 38 is attached tightly to the shaft 45 is similar in construction to the previously described coupling clamp 15. However, clamp 46 is not housed within a pocket in the pulley 38, but has one if its wings 48 enlarged and welded at 47 to the hub of one of the half sections 41. As in the case of clamp 15, clamp 46 comprises a U-shaped strip having jaw wings 48 and an intermediate bight 51. The jaw wings are each provided with a keyhole slot opening including a shaft-receiving opening 52 and a narrow radially extending slot 53 which bifurcates the bight 51. Wings 48 desirably are also provided with a key tab 54 which engages with key groove 55 in the shaft 45.

Jaw actuating bolt 56 having a head 57 and a nut 58 is received through the bight 51. Bight 51 at one side of the slot 53 is cut away to provide a seat 59 for the nut 58. When the pulley of FIG. 4 is assembled with the shaft 45, as shown in FIG. 5, the shaft-receiving opening 52 of the enlarged wing 48 of the clamp 46 is slipped over the flange 43 of the pulley half section 41 to which wing 48 is welded at 47. The other wing 48 is thus disposed in outboard spaced relation to the pulley hub. Shaft 45 is then inserted through the shaft receiving openings and its groove 55 is engaged with the tabs 54 on the clamp. The jaw tightening bolt 56 is then tightened to impose pressure on the lever arms 5 of the clamp jaws 48 to tighten the jaws 48 against the shaft 45. Relaxation of pressure of the bolt 56 will release the pulley from the shaft so that the pulley may be shifted or removed endwise therefrom.

In both embodiments, the clamp provides ample jaw surfaces to embrace the shaft, either directly as in the case of outboard wing 48 of the embodiment of FIGS. 4 and 5, or through the flanges 22 of the embodiment of FIGS. 1, 2 and 3 and flange 43 of the embodiment of FIGS. 4 and 5.

The specific keying arrangement between the clamp or pulley and the shaft is optional. The tab 54 and groove 55 of the embodiment of FIGS. 4 and 5 and the flats 25 and 26 of shaft 23 of the embodiment of FIGS. 1, 2 and 3 are illustrative only.

What is claimed is:

1. In an assembly of a pulley and shaft and a coupling between the pulley and shaft, the improvement in which the coupling comprises a clamp having radially deformable jaws embracing said shaft and a jaw actuator for moving said jaws toward said shaft to clamp the pulley to the shaft, said clamp having a keyhole-shaped shaft-receiving opening, said clamp having free-ended levers extending transversely from the jaws and to which said jaw actuator is connected.

2. In an assembly of a pulley and shaft and a coupling between the pulley and shaft, the improvement in which the coupling comprises a clamp having radially deformable jaws embracing said shaft and a jaw actuator for moving said jaws toward said shaft to clamp the pulley to the shaft, said pulley comprising mating annular sections, said sections having oppositely embossed hub portions which together form an internal pocket within which the clamp is received.

3. The assembly of claim 2 in which said hub portions have access ports which align with the jaw actuator to facilitate manipulation thereof.

4. In an assembly of a pulley and shaft and a coupling between the pulley and shaft, the improvement in which the coupling comprises a clamp having radially deformable jaws embracing said shaft and a jaw actuator for moving said jaws toward said shaft to clamp the pulley to the shaft, said pulley comprising mating annular sections, and means mounting said clamp externally on one said section.

5. In an assembly of a pulley and shaft and a coupling between the pulley and shaft, the improvement in which the coupling comprises a clamp having radially deformable jaws embracing said shaft and a jaw actuator for moving said jaws toward said shaft to clamp the pulley to the shaft, in combination with a key interconnecting the shaft with one of the pulley and clamp.

6. The assembly of claim 5 in which the key comprises a tab on the clamp, said shaft having a tab-engaging groove.

7. The assembly of claim 5 in which the key comprises a pulley flange having a flat, said shaft having a complementary flat.

8. In an assembly of a pulley and shaft and a coupling between the pulley and shaft, the improvement in which the coupling comprises a clamp having radially deformable jaws embracing said shaft and a jaw actuator for moving said jaws toward said shaft to clamp the pulley to the shaft, said pulley having a shaft-receiving opening with a flange thereabout, one of said jaws embracing said flange, said flange having radially deformable walls which deform under pressure of said jaw to clamp against the shaft.

9. In an assembly of a pulley and shaft and a coupling between the pulley and shaft, the improvement in which the coupling comprises a clamp having radially deformable jaws embracing said shaft and a jaw actuator for moving said jaws toward said shaft to clamp the pulley to the shaft, said clamp comprising a U-shaped piece having spaced parallel wings constituting a pair of said jaws and an intermediate slotted bight, said jaw actuator comprising a bolt extending through said bight and bearing on said bight at opposite sides of its slot.

* * * * *